(12) United States Patent
Kaliannan

(10) Patent No.: US 8,806,159 B2
(45) Date of Patent: Aug. 12, 2014

(54) DATA STORAGE RESOURCE MANAGEMENT SYSTEMS AND METHODS

(75) Inventor: Kirubakaran Kaliannan, Beaverton, OR (US)

(73) Assignee: Symantec Corporation, Mountain View, CA (US)

( * ) Notice: Subject to any disclaimer, the term of this patent is extended or adjusted under 35 U.S.C. 154(b) by 248 days.

(21) Appl. No.: 13/083,381

(22) Filed: Apr. 8, 2011

(65) Prior Publication Data
US 2012/0260050 A1   Oct. 11, 2012

(51) Int. Cl.
*G06F 13/00* (2006.01)
*G06F 13/28* (2006.01)

(52) U.S. Cl.
USPC ............... 711/162; 711/E12.009; 707/662

(58) Field of Classification Search
USPC ................. 711/162, E12.009; 707/662
See application file for complete search history.

(56) References Cited

U.S. PATENT DOCUMENTS

| | | | |
|---|---|---|---|
| 6,128,715 A | 10/2000 | Wang et al. | |
| 6,314,501 B1 | 11/2001 | Gulick et al. | |
| 7,353,350 B2 | 4/2008 | Klassen et al. | |
| 7,631,155 B1 | 12/2009 | Bono et al. | |
| 7,653,832 B2 | 1/2010 | Faibish et al. | |
| 7,676,704 B2 | 3/2010 | Hong et al. | |
| 7,694,082 B2 | 4/2010 | Golding et al. | |
| 7,941,709 B1 | 5/2011 | Hong et al. | |
| 2008/0189498 A1* | 8/2008 | Brown ...................... | 711/162 |
| 2010/0049735 A1 | 2/2010 | Hsu | |
| 2010/0191908 A1 | 7/2010 | Yamakawa | |
| 2011/0010495 A1 | 1/2011 | Haustein et al. | |
| 2012/0054746 A1 | 3/2012 | Vaghani et al. | |
| 2012/0311291 A1 | 12/2012 | Fiske et al. | |

* cited by examiner

*Primary Examiner* — Edward Dudek, Jr.
(74) *Attorney, Agent, or Firm* — Wilmer Cutler Pickering Hale and Dorr LLP

(57) ABSTRACT

Storage systems and methods are presented. In one embodiment, a data storage resource management method comprises: performing a data update process, including communicating a data update input output packet between a primary storage resource and a secondary storage resource, wherein corresponding data updates in the secondary storage resource are a mirror of data updates in the primary storage resource; and performing a reclamation process, including: communicating reclamation information in a reclamation input output packet through the same interface as the data update input output packet, wherein the reclamation input output packet is communicated between the primary storage resource and the secondary storage resource; and reclaiming storage locations on the secondary storage resource in accordance with reclamation information in the reclamation input output packet communicated between the primary storage resource and secondary storage resource.

20 Claims, 9 Drawing Sheets

300

310
Reclaiming storage locations in a primary side storage resource.

320
Forming a reclamation input output packet.

330
Processing the reclamation input output packet through an input output staging component.

340
Communicating the reclamation input output packet and corresponding reclamation information through the same interface as a data update input output packet.

350
Reclaiming storage locations in a secondary side storage resource.

FIG 3

DATA STORAGE RESOURCE MANAGEMENT SYSTEMS AND METHODS

FIELD OF THE INVENTION

The present embodiments relate to the field of information storage and storage resource reclamation.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Maintaining accurate replicated backup storage of the information is often very important for a variety or reasons (e.g., disaster recovery, corruption correction, system maintenance, etc.). However, maintaining large duplicate resources is typically very complicated, resource intensive and expensive.

Some conventional attempt to utilize thin storage to provision a primary storage resource (e.g., primary volume group, etc.). The virtual nature of thin storage can offer some flexibility to create a very large volume (e.g., storage container for the filesystem, etc.). Attempts to replicate the primary thin storage on a secondary storage resource similarly involves provisioning a large volume of the same size, however conventional attempts to provide thin storage to provision a primary storage resource and secondary storage resource are often complicated and difficult. It is usually very difficult or complex to support some thin storage functionality such as reclamation on the secondary storage resource.

SUMMARY

Storage systems and methods are presented. In one embodiment, a data storage resource management method comprises: performing a data update process, including communicating a data update input output packet between a primary storage resource and a secondary storage resource, wherein corresponding data updates in the secondary storage resource are a mirror of data updates in the primary storage resource; and performing a reclamation process, including: communicating reclamation information in a reclamation input output packet through the same interface as the data update input output packet, wherein the reclamation input output packet is communicated between the primary storage resource and the secondary storage resource; and reclaiming storage locations on the secondary storage resource in accordance with reclamation information in the reclamation input output packet communicated between the primary storage resource and the secondary storage resource.

In one embodiment, the data storage resource management method includes reclaiming of the storage locations on the secondary storage resource is performed in the same order as reclamation on the primary storage resource with respect to the data updates on the primary storage resource and the corresponding data updates on the secondary storage resource. The reclamation input output packet can include a reclamation indication flag and reclaim specific meta data. The reclamation on the secondary resource can be performed online with a running application unaltered with respect to the reclamation on the secondary side. In one exemplary implementation, the reclamation input output packet is logged in a staging component in the order it is received and is temporarily stored in an input output buffer. The reclamation input output packet can include a storage location offset to begin reclamation and an indication of the amount of storage locations to be reclaimed. The secondary resource can decode the reclamation information in the reclamation packet.

In one embodiment, a reprogrammable tangible computer readable medium having stored thereon, computer executable instructions that when executed by a computer system cause the computer system to perform a method comprises: performing a data update process, including communicating a data update input output packet between a primary storage resource and a secondary storage resource, wherein corresponding data updates in the secondary storage resource are a mirror of data updates in the primary storage resource; and performing a reclamation process, including: communicating reclamation information in a reclamation input output packet through the same interface as the data update input output packet, wherein the reclamation input output packet is communicated between the primary storage resource and the secondary storage resource; and reclaiming storage locations on the secondary storage resource in accordance with reclamation information in the reclamation input output packet communicated between the primary storage resource and the secondary storage resource.

In one embodiment, the reprogrammable tangible computer readable medium includes instructions for reclaiming of the storage locations on the secondary storage resource is performed in the same order as reclamation on the primary storage resource with respect to the data updates on the primary storage resource and the corresponding data updates on the secondary storage resource. The reclamation input output packet can include a reclamation indication flag and reclaim specific meta data. The reclamation on the secondary resource can be performed online with a running application unaltered with respect to the reclamation on the secondary side. In one exemplary implementation, the reclamation input output packet is logged in a staging component in the order it is received and is temporarily stored in an input output buffer. The reclamation input output packet can include a storage location offset to begin reclamation and an indication of the amount of storage locations to be reclaimed. The secondary resource can decode the reclamation information in the reclamation packet.

In one embodiment, a computer system comprising a processor coupled to a computer readable storage media and executing computer readable code which causes the computer system to perform operations including: performing a data update process, including communicating a data update input output packet between a primary storage resource and a secondary storage resource, wherein corresponding data updates in the secondary storage resource are a mirror of data updates in the primary storage resource; and performing a reclamation process, including: communicating reclamation information in a reclamation input output packet through the same interface as the data update input output packet, wherein the reclamation input output packet is communicated between the primary storage resource and the secondary storage resource; and reclaiming storage locations on the secondary storage resource in accordance with reclamation information in the reclamation input output packet communicated between the primary storage resource and the secondary storage resource.

In one embodiment, the computer system instructions include reclaiming of the storage locations on the secondary storage resource is performed in the same order as reclamation on the primary storage resource with respect to the data updates on the primary storage resource and the corresponding data updates on the secondary storage resource. The reclamation input output packet can include a reclamation indication flag and reclaim specific meta data. The reclamation on the secondary resource can be performed online with a running application unaltered with respect to the reclamation on the secondary side. In one exemplary implementation, the reclamation input output packet is logged in a staging component in the order it is received and is temporarily stored in an input output buffer. The reclamation input output packet can include a storage location offset to begin reclamation and an indication of the amount of storage locations to be reclaimed. The secondary resource can decode the reclamation information in the reclamation packet.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 3 is a block diagram of an exemplary reclamation process in accordance with one embodiment of the present invention.

DETAILED DESCRIPTION

Figure 1:
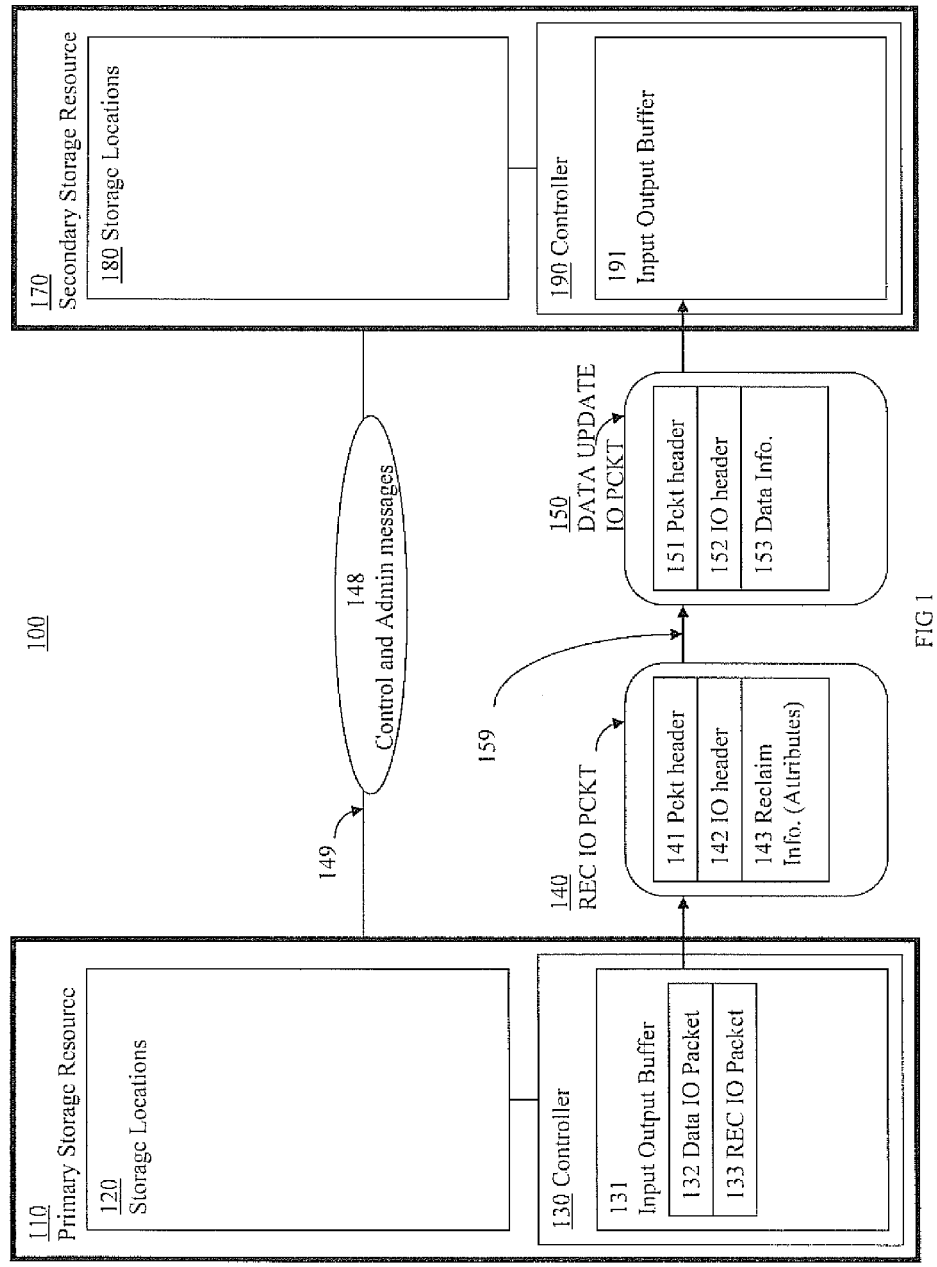
FIG. 1 is a block diagram of an exemplary information storage system in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Reclamation systems methods described in the following detailed description can facilitate efficient and effective reclamation of storage resources. The reclamation information can be communicated to secondary storage resources in line with data update information. In one embodiment, reclamation information is formulated into a format similar to a regular data update input output request. In one exemplary implementation, reclamation information is formulated into a reclamation input output packet similar to a regular data update input output packet. The reclamation input output packet can be compact version with reclamation attributes (e.g., location offset, number of reclamation locations, etc.). The reclamation input output packet can include a tag or flag indicating it is a reclamation input output packet rather than a data update input output packet. In one embodiment, data update information and reclamation information are forwarded to a staging component and logged in the staging component in the order or sequence which they are executed on the primary storage resource. A replication thread reads the data update information and reclamation information in the staging component in the same respective order or sequence are which they are received and forwards them to the secondary storage resource staging component accordingly.

A reclamation process can be performed on the secondary storage resource based upon the reclamation information received from the primary storage resource. In one embodiment, a secondary storage resource staging component decodes information received from the primary storage and forwards the data update information and the reclamation for further processing. In one embodiment, a replication thread reads data update information and reclamation information in the respective order or sequence which they are received (e.g., similar to the order executed on the primary storage resource, etc.) and directs similar data update and reclamation operations in a similar respective order on the secondary storage resource. Primary storage resources and secondary storage resources can be located remotely from one another. Additional information on reclamation input output packets and reclamation information communication between primary storage resources and secondary storage resources is described in following portions of the detailed description.

FIG. 1 is a block diagram of an exemplary information storage system 100 in accordance with one embodiment of the present invention. Information storage system 100 includes primary storage resource 110 and secondary storage resource 170. Primary storage resource 110 and secondary storage resource 170 are communicatively coupled to one another by control and administration bus 149 and input output communication bus 159. Primary storage resource 110 includes storage locations 120 and controller 130. Controller 130 includes input output buffer 131. Secondary storage resource 170 includes storage locations 180 and controller 190. Controller 190 includes input output buffer 191.

Components of information storage system 100 cooperatively operate to store information. Primary storage resource 110 is considered "mounted" and utilized for participating in information storage for a running or active application (e.g., production applications, accounting applications, word processing applications, etc.). In one embodiment, data is stored in storage locations 120. Secondary storage resource 170 is not considered "mounted" with respect to some running or active applications (e.g., production applications, accounting applications, word processing applications, etc.). Secondary storage resource 170 stores raw data in storage locations 180 that is substantially a duplicate of data stored in storage locations 120. In one embodiment, secondary storage resource 170 can be a backup or recovery resource (e.g., duplicate data, mirror data, etc.) if there is a problem with primary storage resource 110. In one embodiment, the backup or mirrored data is stored in storage locations 180.

In one embodiment, controller 130 controls data storage in storage locations 120 and controller 190 controls data storage in storage locations 180. Controller 130 can also direct forwarding and receiving of data to and from primary storage resource 110. Similarly, controller 190 can direct forwarding and receiving of data to and from secondary storage resource 170. In one embodiment, controller 130 directs forwarding of data update information in data update input output packets to the secondary storage resource 170. The data update information can include data that an application wrote or stored in primary storage resource 110. In one exemplary implementation, the data update information is temporarily stored in input output buffer 131 while waiting to be formed into a data update input output packet and forwarded to the secondary storage resource 170 for backup (e.g., duplicate, mirror, etc.) storage. In one embodiment, controller 190 directs receipt of the data update information in the data update input output packets and also directs the backup storage of the data update information in the storage locations 180.

In one embodiment, controller 130 and controller 190 also participate in reclamation operations associated with storage locations 120 and 180 respectively. In one exemplary implementation, controller 130 and 190 direct reclamation of respective storage locations. Controller 130 can direct reclamation of storage locations in storage locations 120 in response to a reclamation trigger (e.g., deletion, etc.). Controller 130 also can direct creation of corresponding reclamation information for storage in input output buffer 131. In one embodiment, the reclamation information is temporarily stored in input output buffer 131 while waiting to be formed into a reclamation input output packet and forwarded to the secondary storage resource 170. In one embodiment, controller 190 directs receipt of the reclamation information in the reclamation date input output packets and also directs the reclamation of storage locations in the storage locations 180.

It is appreciated that order (e.g., sequence, respective timing, respective occurrence, etc.) of data update and reclamation with respect to one another can be maintained. In one embodiment, staging component portions of controller 130 and 190 act as a staging component. In one exemplary implementation, data updates and reclamations are logged in the staging component. The staging component can be included in a portion of controllers 120 and 130 or the staging component can be at least partially a separate component. The input output buffer 131 and input output buffer 191 can first-in-first-out buffers that facilitate maintenance of respective data update and reclamation execution order or sequence between the primary storage resource 110 and the secondary storage resource 170.

In one exemplary implementation, primary storage resource 110 forwards data update input output packet 150 and reclamation input output packet 140 to secondary storage resource input output buffer 191. Data update input output packet 150 includes packet header 151, input output header 152 and data update information 153. Reclamation input output packet 140 has a similar configuration except reclamation input output packet 140 includes reclamation information. Reclamation input output packet 140 includes packet header 141, input output header 142 and reclamation information 143. In one embodiment, the reclamation information 143 includes reclamation attributes (e.g., reclamation meta data, etc.). Input output buffer 131 includes data update input output packet 132 and reclamation input output packet 133 waiting to be forwarded to input output buffer 190.

In one embodiment, data update input output packets and reclamation input output packets have similar configuration. The data update input output packets and reclamation input output packets both have a packet header, input output header and a payload portion. The packet header includes communication header information. The communication header information can include communication protocol information (e.g., destination, source, size, etc.). The input output header that includes input output type information (e.g., indication the input output is a data update, reclamation etc.) The payload portion includes data update information if the input output packet is a data update input output packet. Data update information can indicate information to be updated or replicated on the secondary storage resource. The payload portion includes reclamation information if the input output packet is a reclamation input output packet. Reclamation information can include various information (e.g., reclamation attributes, reclamation metadata, etc.).

Figure 2:
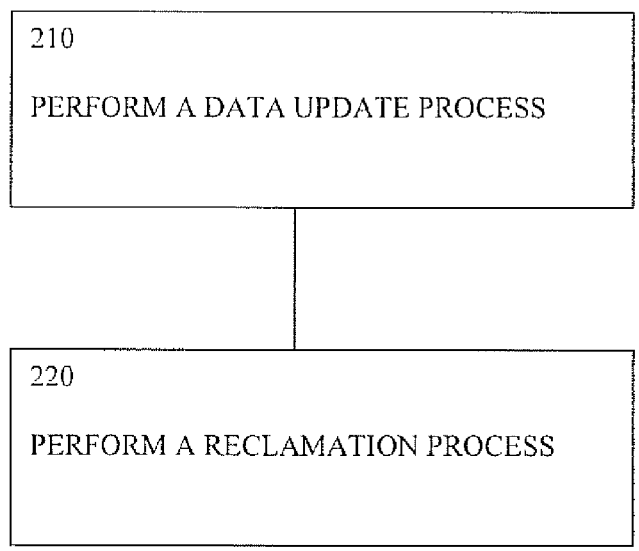
FIG. 2 is a block diagram of an exemplary data storage resource management method in accordance with one embodiment of the present invention.

FIG. 2 is a block diagram of an exemplary data storage resource management method 200 in accordance with one embodiment of the present invention.

In block 210, a data update process is performed. In one embodiment, the data update process includes communicating a data update input output packet between a primary storage resource and a secondary storage resource. In one exemplary implementation, corresponding data updates in the secondary storage resource are a mirror of data updates in the primary storage resource. The data update input output packet includes information associated with data updates on the primary side. Data in the secondary storage resource is updated in accordance with information in the data update input output packet. In one embodiment, data updates in the secondary storage resource are a mirror of data updates in the primary storage resource.

In block 220, a reclamation process is performed. In one embodiment, storage locations are reclaimed on a primary storage resource. Information regarding the storage location reclaimed on the primary site is forwarded in a reclamation input output packet to a secondary storage resource. In one embodiment, the reclamation input output packet and corresponding reclamation information is communicated through the same interface as the data update input output packet. Storage locations on the secondary storage resource are reclaimed in accordance with reclamation information in the reclamation input output packet communicated between the primary storage resource and the secondary storage resource.

FIG. 3 is a block diagram of an exemplary reclamation process 300 in accordance with one embodiment of the present invention. In one embodiment, reclamation process 300 is similar to the reclamation process of block 220.

In block 310, storage locations in a primary side storage resource are reclaimed. In one embodiment, reclamation of storage locations in primary side storage resources can be initiated based upon various triggers (e.g., deletion, unused, etc.).

In block 320, a reclamation input output packet is formed. In one embodiment, the reclamation input output packet includes a reclamation indication flag and reclaim specific meta data. The reclamation flag can be a series of bits that identify the packet as a reclamation input output packet rather than a data update input output packet. In one embodiment, the meta data includes an offset and length of storage resource locations to be reclaimed. The offset and length of storage resource locations to be reclaimed can correspond to an offset and length of storage resource locations reclaimed on a primary storage resource.

In block 330, the reclamation input output packet is processed through an input output staging component. In one embodiment, the reclamation input output packet is logged in a staging component in the order it is received. The input output buffer can be temporarily stored in an input output buffer. In one embodiment, data updates are also processed through the input output staging area.

In block 340, the reclamation input output packet and corresponding reclamation information is communicated through the same interface as the data update input output packet. In one exemplary implementation, the reclamation input output packet is communicated between the primary storage resource and the secondary storage resource.

In block 350, reclamation is performed on the secondary resource. In one embodiment, reclaiming of the storage locations on the secondary storage resource is performed in the same order as reclamation on the primary storage resource. In one exemplary implementation, the order is maintained with respect to the data updates on the primary storage resource and the corresponding data updates on the secondary storage resource. In one embodiment, the secondary resource decodes the reclamation information (e.g., meta data, offset indication, number of resource locations, etc.) in the reclamation packet. Reclamation on the secondary resource can be performed online with a running application unaltered with respect to the reclamation on the secondary side.

It is appreciated that reclamation information communicated from the primary storage resource to the secondary storage resource can be reduced. In one embodiment, a reclaim request can be relatively large (e.g., gigabytes, etc.) and converting a reclaim request of offset and length to a reclaim input output packet request can use a relatively large buffer to perform a corresponding write input output. In one embodiment, an input output buffer is manipulated to hold the address of a relatively small amount of information (e.g., address of approximately 1 block, etc.) which carries reclamation meta data. In one exemplary implementation, the new buffer (e.g., of approximately one block size, etc.) can be logged in an input output staging component.

In one embodiment, the same input output buffer can participate in both data updates and reclamation operations and separate or external interfaces are not required to communicate the data update information and reclamation information. In one exemplary implementation, the input output buffer can be utilized efficiently without allocating a relatively large buffer of reclaimable size. The input output buffer data space can be used to hold the meta data required to convey reclamation information to the secondary storage resource.

In one embodiment, while filesystem information may be available on the secondary storage resource, the filesystem information is not required on the secondary storage resource for reclamation operations. In one exemplary implementation, the reclamation on the secondary storage resource is online and does not interfere with application or primary storage resource operations (e.g., does not require application downtime, application migration, application takeover, replication freeze, etc.).

It is appreciated that replication of primary storage resource information on a secondary storage resource (e.g., including data updates, storage location reclamation, etc.), can be performed in a synchronous mode or an asynchronous or periodic reclamation replication mode. In a synchronous mode, the replication can be substantially immediate facilitating substantially consistent data between the primary storage resource and secondary storage resource at any given point in time. The reclamation can also be performed substantially synchronously on the secondary storage resource. In an asynchronous mode, the replication is not immediate and information (e.g., data updates, etc.) on the secondary storage resource may not be consistent with the information on primary storage resource at a given point in time. It is appreciated that information in the secondary storage resource becomes consistent with information on the primary storage resource when the data update and reclamation approach described herein in the detailed description are applied. In one embodiment, reclamation on the secondary storage resource is not applied immediately and the storage resource reclamation is delayed at least until a consistent respective order or point corresponding to when the reclamation was issued on the primary storage resource. The timing difference between reclamation on the primary storage resource and secondary storage resource can depend upon a variety of factors (e.g., bandwidth, scheduled periodic timing, etc.). In one embodiment, communicating the reclamation information in the same respective order and in the same input output communication channel as the data updates facilitates reduction of consistency problems associated with respective execution order or sequence between the primary storage resource and the secondary storage resource regardless of whether the reclamation is performed in a synchronous or asynchronous mode.

Figure 4:
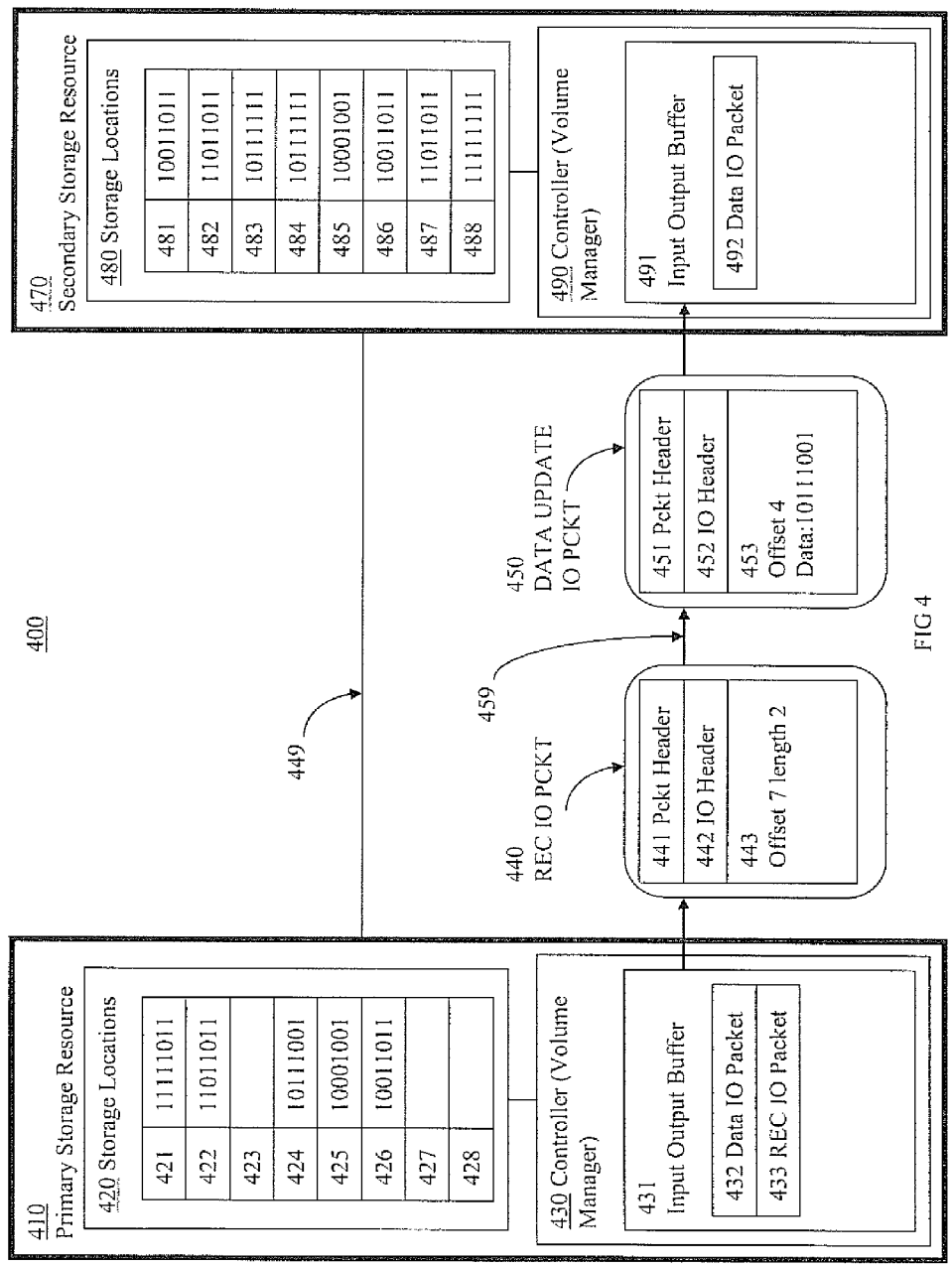
FIG. 4 is a block diagram of an exemplary information storage system at a first point in time in accordance with one embodiment of the present invention.

FIG. 4 is a block diagram of a block diagram of an exemplary information storage system 400 at a first point in time in accordance with one embodiment of the present invention. Information storage system 400 is similar to information storage system 100. Information storage system 400 includes primary storage resource 410 and secondary storage resource 470. Primary storage resource 410 and secondary storage resource 470 are communicatively coupled to one another by control and administration bus 449 and input output communication bus 459. Primary storage resource includes storage 410 locations 420 and controller 430. Controller 430 includes input output buffer 431. Secondary storage resource 470 includes storage locations 480 and controller 490. Controller 490 includes input output buffer 491. In one embodiment, controller 430 and 490 are volume managers. Storage locations 420 includes storage locations 421, 422, 423, 424, 425, 426, 427, and 428. Storage locations 480 include storage locations 481, 482, 483, 484, 485, 486, 487, and 488. Storage locations 422, 425 and 426 store similar information as 482, 485 and 486 (e.g., 11011011, 10001001, and 10011011 respectively). However several data update and reclamation operations have occurred in primary storage resource 410 that have not yet been replicated in secondary storage resource 170.

Data in primary storage location 424 has been updated from 10111111 (e.g., still stored in secondary storage location 484) to 10111001. This update is being communicated in data update input output packet 450 which includes the packet header 451, input output header 452, and payload portion 453. Input output header 452 indicates the payload portion 453 includes reclamation information. The payload portion 453 indicates the $4^{th}$ storage location (e.g., 424) is updated to 10111001.

Primary storage locations 427 and 428 have been reclaimed. This reclamation is being communicated in reclamation input output packet 440 which includes the packet header 441, input output header 442 and payload portion 443. Input output header 442 indicates the payload portion 443 includes reclamation information. Payload portion 443 includes an offset 7 and length (e.g., number of resources locations being reclaimed) of 2 indicating that the $7^{th}$ and $8^{th}$ storage locations (e.g., 427 and 428 respectively) are reclaimed.

Data in primary storage location 421 has been updated from 10011011 (e.g., still stored in secondary storage location 481) to 11111011. This update information is stored in buffer location 432 as a data update input output packet. The information in input output buffer 432 is communicated after reclamation input output packet 440. Primary storage location 423 has been reclaimed. This update information is stored in buffer location 433 as a reclamation input output packet. The information in input output buffer 433 is communicated after the information in input output buffer 432.

Figure 5:
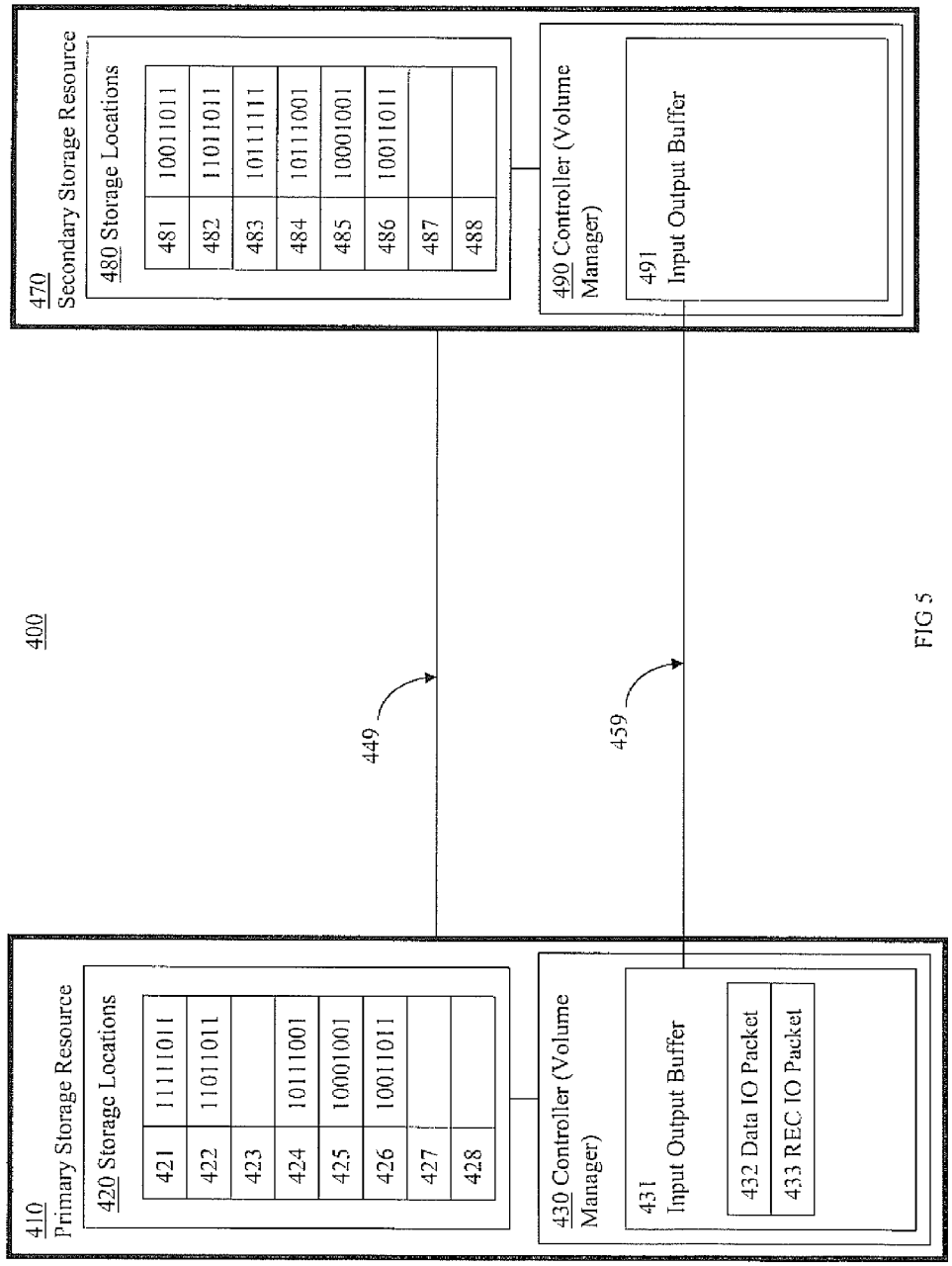
FIG. 5 is a block diagram of an exemplary information storage system at a second point in time in accordance with one embodiment of the present invention.

FIG. 5 is a block diagram of an exemplary information storage system 400 at a second point in time in accordance with one embodiment of the present invention. In FIG. 5, the data update operations associated with data update input output packet 450 and reclamation input output packet 440 have been performed. Secondary storage location 484 has been updated to 10111001 to correspond with primary storage location 424 and secondary storage locations 487 and 484 have been reclaimed to correspond to storage locations 427 and 428.

Figure 6:
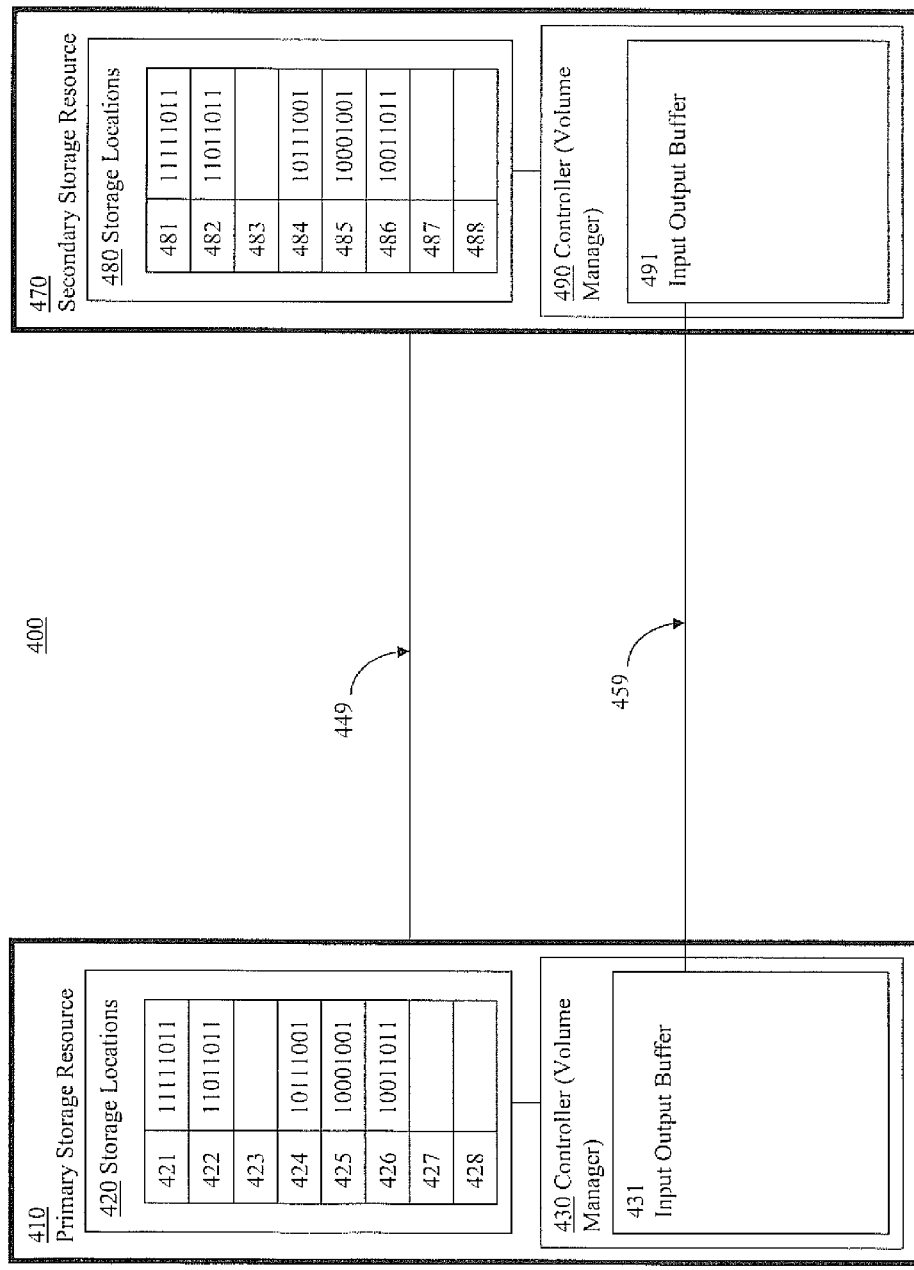
FIG. 6 is a block diagram of an exemplary information storage system at a third point in time in accordance with one embodiment of the present invention.

FIG. 6 is a block diagram of an exemplary information storage system 400 at a third point in time in accordance with one embodiment of the present invention. In FIG. 6, the data update operations associated with information previously in input output buffer locations 432 and 433 have been performed. Secondary storage location 481 has been updated to 11111011 to correspond with primary storage location 421 and secondary storage location 483 has been reclaimed to correspond to storage location 423.

Figure 7:
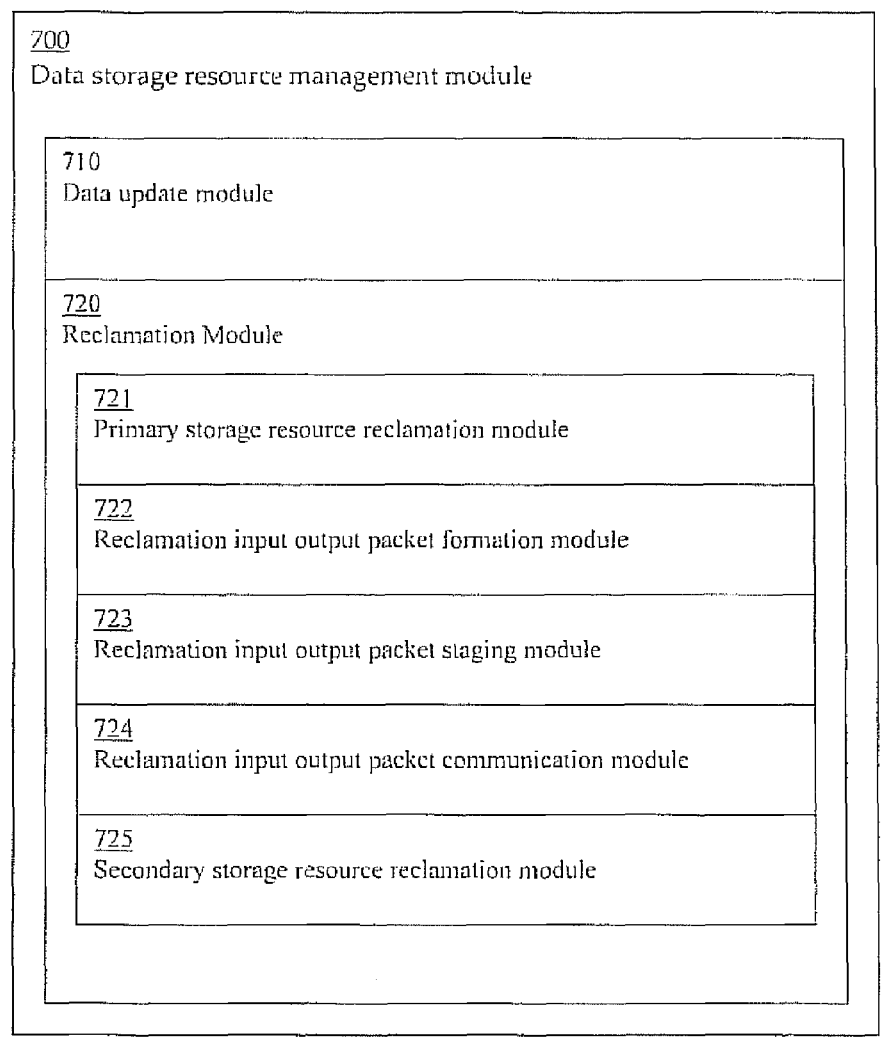
FIG. 7 is a block diagram of an exemplary storage resource management module in accordance with one embodiment of the present invention.

FIG. 7 is a block diagram of storage resource management module 700 which includes instructions for directing a processor in the performance of a storage resource management method (e.g., storage resource management method 200, etc.) in accordance with one embodiment of the present invention. Storage resource management module 700 includes data update module 710 and reclamation module 720. In one embodiment, reclamation module 720 includes primary storage resource reclamation module 721, reclamation input output packet formation module 722, reclamation input output packet staging module 723, reclamation input output packet communication module 724, and secondary storage resource reclamation module 725. Data update module 710 includes instructions for performing data update. In one embodiment, data update module 710 includes instructions for performing data update operations as indicated in block 210. Reclamation module 720 includes instructions for performing reclamation. In one embodiment, reclamation module 720 includes instructions for performing reclamation operations as indicated in block 210.

Primary storage resource reclamation module 721 includes instructions for performing primary storage resource reclamation. In one embodiment, primary storage resource reclamation module 721 includes instructions for performing primary storage resource reclamation operations as indicated in block 310. Reclamation input output packet formation module 722 includes instructions for performing reclamation input output packet formation. In one embodiment, reclamation input output packet formation module 722 includes instructions for performing reclamation input output packet formation operations as indicated in block 320. Reclamation input output packet staging module 723 includes instructions for performing input output packet staging. In one embodiment, module 723 includes instructions for performing operations as indicated in block 330. Reclamation input output packet communication module 724 includes instructions for performing reclamation input output packet communication. In one embodiment, reclamation input output packet communication module 724 includes instructions for performing reclamation input output packet communication operations as indicated in block 340. Secondary storage resource reclamation module 725 includes instructions for performing secondary storage resource reclamation. In one embodiment, secondary storage resource reclamation module 725 includes instructions for performing secondary storage resource reclamation operations as indicated in block 315.

Figure 8:
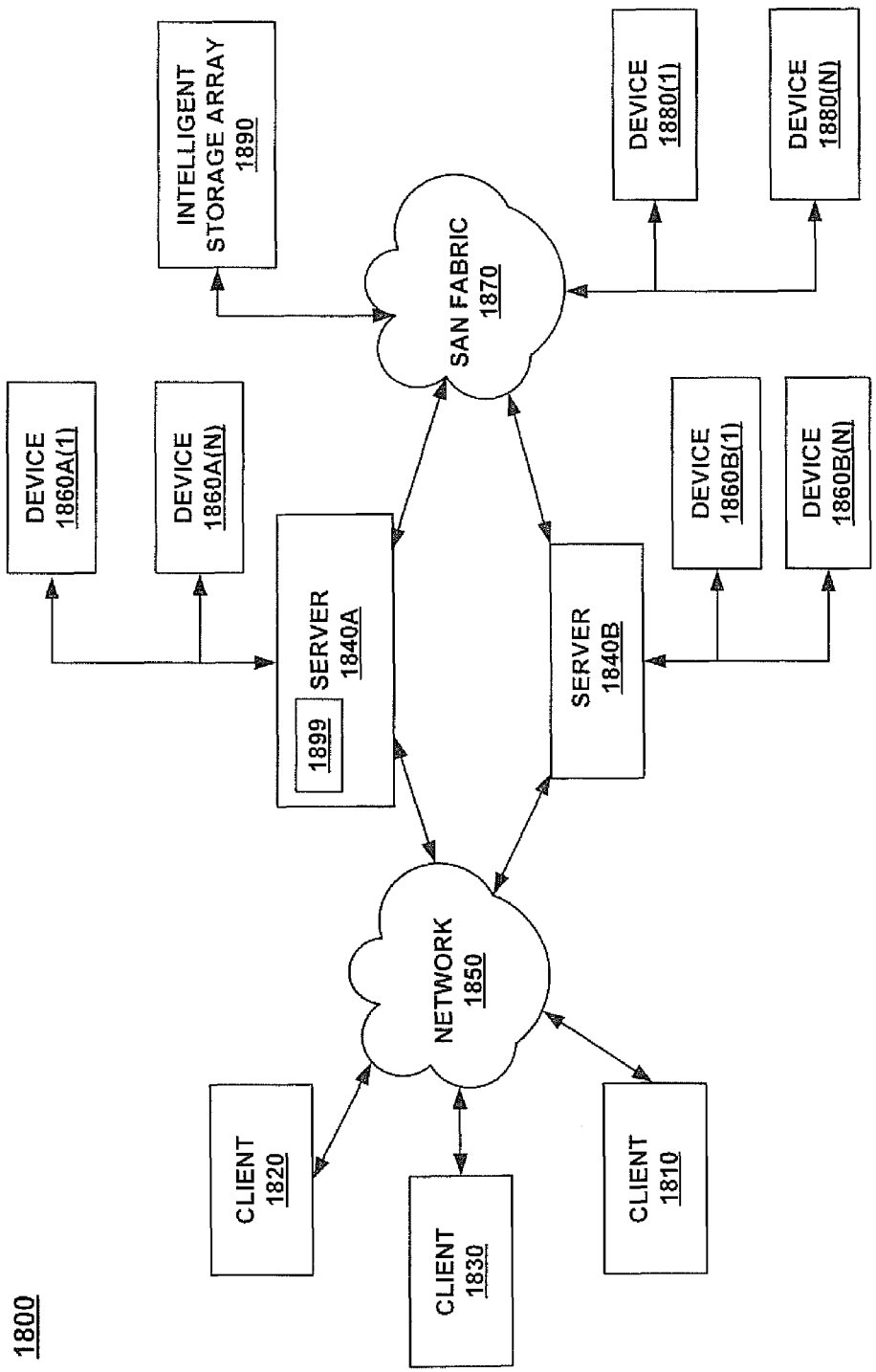
FIG. 8 is a block diagram depicting an exemplary network architecture in accordance with one embodiment of the present invention.

It is appreciated present storage systems and methods can be implemented as part of a variety of environments. For example, data storage resource management systems and methods can be implemented as part of a distributed computing environment, a cloud computing environment, a virtual environment, a client server environment, etc. In one embodiment, a data storage resource management method (e.g., data storage resource management method 200, etc.) can be implemented on a network. FIG. 8 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes storage resource management module 1899. In one embodiment, storage resource management module 1899 is similar to storage resource management module 700. It is appreciated that present systems and methods are compatible with a variety of implementations. For example, portions of information and instructions associated with can be distributed in various resources.

Figure 9:
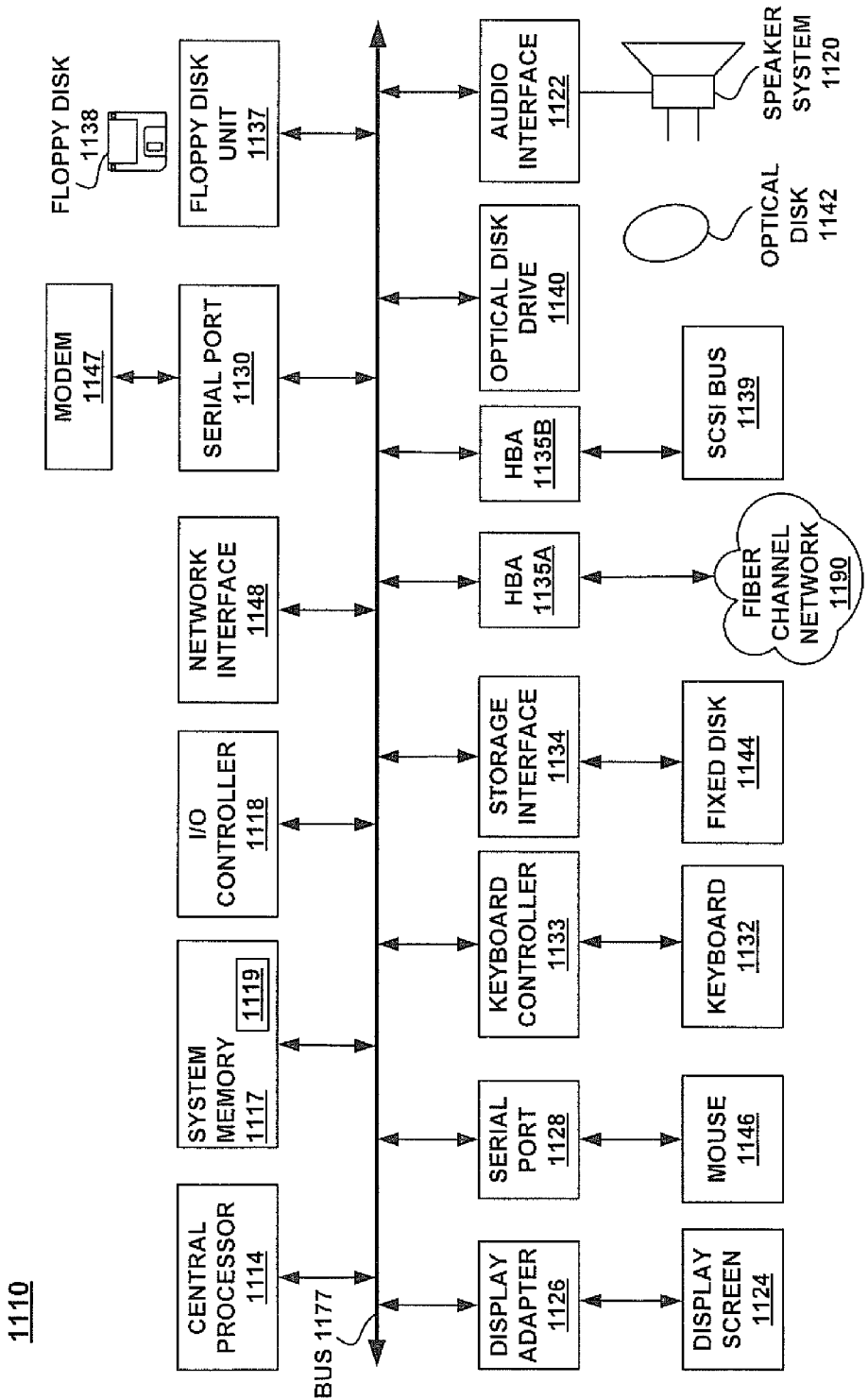
FIG. 9 depicts a block diagram of an exemplary computer system in accordance with one embodiment of the present invention.

FIG. 9 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing a storage resource management method (e.g., similar to data storage resource management method 200, etc.) are stored in one or more memories of computer system 1100 (e.g., in memory location 1119). The RAM is generally the main memory into which the operating system and application programs are loaded. In one embodiment, RAM 1117 includes a storage resource management module (e.g., in memory location 1119). In one embodiment, a storage resource management module stored in memory location 1119 is similar to storage resource management module 700. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 8 depicts the use of a network such as the Internet for exchanging data, but the present disclosure is not limited to the Internet or any particular network-based environment.

Thus, the present systems and methods facilitate efficient and storage resource management and reclamation. Unlike conventional attempts, systems and methods similar to those included in the present detailed description can facilitate consistent and convenient reclamation. The data resource management operations of the present detailed descriptions facilitate keeping the data updates (e.g., writes, etc.) and reclamation in the same respective order on the secondary storage resources as the primary storage resources and help maintain data consistency between them.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A data storage resource management method comprising:
   performing a data update process, including communicating a data update input output packet between a primary storage resource and a secondary storage resource, wherein corresponding data updates in the secondary storage resource are a mirror of data updates in the primary storage resource; and
   performing a reclamation process, including:
      reclaiming a storage location at the primary storage resource;
      generating reclamation information indicating that the storage location has been reclaimed;
      storing the reclamation information in a buffer at the primary storage resource;
      generating a reclamation input output packet at the primary storage resource based on the reclamation information stored in the buffer that indicates the storage location that has been reclaimed, the reclamation input output packet being separate from the storage location, the data update input output packet, and the buffer;
      communicating the reclamation input output packet through the same interface as the data update input output packet, wherein the reclamation input output packet is communicated between the primary storage resource and the secondary storage resource; and
      reclaiming storage locations on the secondary storage resource in accordance with reclamation information in the reclamation input output packet communicated between the primary storage resource and the secondary storage resource.

2. The data storage resource management method of claim 1, wherein the reclaiming of the storage locations on the secondary storage resource is performed in the same order as reclamation on the primary storage resource with respect to the data updates on the primary storage resource and the corresponding data updates on the secondary storage resource.

3. The data storage resource management method of claim 2, wherein the reclamation input output packet includes a reclamation indication flag and reclaim specific meta data.

4. The data storage resource management method of claim 1, wherein reclamation on the secondary resource is performed online with a running application unaltered with respect to the reclamation on the secondary side.

5. The data storage resource management method of claim 1, wherein the reclamation input output packet is logged in a staging component in the order it is received and is temporarily stored in the buffer.

6. The data storage resource management method of claim 1, wherein the reclamation input output packet includes a packet header, an input output header, and a payload that indicates a storage location offset to begin reclamation and an indication of the amount of storage locations to be reclaimed.

7. The data storage resource management method of claim 1, wherein the secondary resource decodes the reclamation information in the reclamation packet.

8. A reprogrammable tangible computer readable storage medium having stored thereon computer executable instructions that, when executed by a computer system, cause the computer system to perform a method comprising:
   performing a data update process, including communicating a data update input output packet between a primary storage resource and a secondary storage resource, wherein corresponding data updates in the secondary storage resource are a mirror of data updates in the primary storage resource; and
   performing a reclamation process, including:
      reclaiming a storage location at the primary storage resource;
      generating reclamation information indicating that the storage location has been reclaimed;
      storing the reclamation information in a buffer at the primary storage resource;
   generating a reclamation input output packet at the primary storage resource based on the reclamation information stored in the buffer that indicates the storage location that has been reclaimed, the reclamation input output packet being separate from the storage location, the data update input output packet, and the buffer;
   communicating the reclamation input output packet through the same interface as the data update input output packet, wherein the reclamation input output packet is communicated between the primary storage resource and the secondary storage resource; and reclaiming storage locations on the secondary storage resource in accordance with reclamation information in the reclamation input output packet communicated between the primary storage resource and the secondary storage resource.

9. The reprogrammable tangible computer readable storage medium of claim 8, wherein the reclaiming of the storage locations on the secondary storage resource is performed in the same order as reclamation on the primary storage resource with respect to the data updates on the primary storage resource and the corresponding data updates on the secondary storage resource.

10. The reprogrammable tangible computer readable storage medium of claim 8, wherein the reclamation input output packet includes a reclamation indication flag and reclaim specific meta data.

11. The reprogrammable tangible computer readable storage medium of claim 8, wherein reclamation on the secondary resource is performed online with a running application unaltered with respect to the reclamation on the secondary side.

12. The reprogrammable tangible computer readable storage medium of claim 8, wherein the reclamation input output packet is logged in a staging component in the order it is received and is temporarily stored in the buffer.

13. The reprogrammable tangible computer readable storage medium of claim 8, wherein the reclamation input output packet includes a packet header, an input output header, and a payload that indicates a storage location offset to begin reclamation and an indication of the amount of storage locations to be reclaimed.

14. The reprogrammable tangible computer readable storage medium of claim 8, wherein the secondary resource decodes the reclamation information in the reclamation packet.

15. A computer system comprising:
a processor coupled to a computer readable storage media and executing computer readable code which causes the computer system to perform operations including:
performing a data update process, including communicating a data update input output packet between a primary storage resource and a secondary storage resource, wherein corresponding data updates in the secondary storage resource are a mirror of data updates in the primary storage resource; and
performing a reclamation process, including:
reclaiming a storage location at the primary storage resource;
generating reclamation information indicating that the storage location has been reclaimed;
storing the reclamation information in a buffer at the primary storage resource;
generating a reclamation input output packet at the primary storage resource based on the reclamation information stored in the buffer that indicates the storage location that has been reclaimed, the reclamation input output packet being separate from the storage location, the data update input output packet, and the buffer;
communicating the reclamation input output packet through the same interface as the data update input output packet, wherein the reclamation input output packet is communicated between the primary storage resource and the secondary storage resource; and
reclaiming storage locations on the secondary storage resource in accordance with reclamation information in the reclamation input output packet communicated between the primary storage resource and the secondary storage resource.

16. The computer system of claim 15, wherein the reclaiming of the storage locations on the secondary storage resource is performed in the same order as reclamation on the primary storage resource with respect to the data updates on the primary storage resource and the corresponding data updates on the secondary storage resource.

17. The computer system method of claim 15, wherein the reclamation input output packet includes a reclamation indication flag and reclaim specific meta data.

18. The computer system of claim 15, wherein reclamation on the secondary resource is performed online with a running application unaltered with respect to the reclamation on the secondary side.

19. The computer system of claim 15, wherein the reclamation input output packet is logged in a staging component in the order it is received and is temporarily stored in the buffer.

20. The computer system of claim 15, wherein the secondary resource decodes the reclamation information in the reclamation packet.

* * * * *